United States Patent
Ranade et al.

(10) Patent No.: US 9,596,605 B2
(45) Date of Patent: *Mar. 14, 2017

(54) DYNAMIC PSK FOR HOTSPOTS

(71) Applicant: Ruckus Wireless, Inc., Sunnyvale, CA (US)

(72) Inventors: Prashant Ranade, San Jose, CA (US); Ming-Jye Sheu, San Jose, CA (US)

(73) Assignee: RUCKUS WIRELESS, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/981,579

(22) Filed: Dec. 28, 2015

(65) Prior Publication Data

US 2016/0192196 A1    Jun. 30, 2016

Related U.S. Application Data

(63) Continuation of application No. 14/294,012, filed on Jun. 2, 2014, now Pat. No. 9,226,146, which is a continuation of application No. 13/370,201, filed on Feb. 9, 2012, now Pat. No. 8,756,668.

(51) Int. Cl.
  *H04L 29/06* (2006.01)
  *H04W 12/08* (2009.01)
  *H04W 12/04* (2009.01)

(52) U.S. Cl.
  CPC .......... *H04W 12/08* (2013.01); *H04L 63/062* (2013.01); *H04L 63/083* (2013.01); *H04W 12/04* (2013.01)

(58) Field of Classification Search
  USPC .......................................................... 726/6
  See application file for complete search history.

(56) References Cited

U.S. PATENT DOCUMENTS

| | | |
|---|---|---|
| 4,176,356 A | 11/1979 | Foster |
| 4,193,077 A | 3/1980 | Greenberg |
| 4,253,193 A | 2/1981 | Kennard |

(Continued)

FOREIGN PATENT DOCUMENTS

| | | |
|---|---|---|
| CN | 1351789 A | 5/2002 |
| CN | 1414731 A | 4/2003 |

(Continued)

OTHER PUBLICATIONS

US 9,015,816, 04/2015, Sheu (withdrawn)

(Continued)

*Primary Examiner* — Jason Lee
(74) *Attorney, Agent, or Firm* — Lewis Roca Rothgerber Christie LLP

(57) ABSTRACT

Systems and methods for providing secured network access are provided. A user device located within range of a hotspot initiates a request sent via an open communication network associated with the hotspot. The request concerns secured network access at the hotspot by the user device. A unique pre-shared key is generated for the user device based on information in the received request and transmitted over the open communication network for display on a webpage accessible to the user device. The unique pre-shared key is stored in association with information regarding the user device. The user device may then use the unique pre-shared key in subsequent requests for secured network access.

20 Claims, 2 Drawing Sheets

(56) References Cited

U.S. PATENT DOCUMENTS

| | | |
|---|---|---|
| 4,305,052 A | 12/1981 | Baril |
| 4,513,412 A | 4/1985 | Cox |
| 4,814,777 A | 3/1989 | Monser |
| 5,097,484 A | 3/1992 | Akaiwa |
| 5,173,711 A | 12/1992 | Takeuchi |
| 5,203,010 A | 4/1993 | Felix |
| 5,220,340 A | 6/1993 | Shafai |
| 5,373,548 A | 12/1994 | McCarthy |
| 5,507,035 A | 4/1996 | Bantz |
| 5,559,800 A | 9/1996 | Mousseau |
| 5,754,145 A | 5/1998 | Evans |
| 5,767,809 A | 6/1998 | Chuang |
| 5,802,312 A | 9/1998 | Lazaridis |
| 5,964,830 A | 10/1999 | Durett |
| 6,034,638 A | 3/2000 | Thiel |
| 6,094,177 A | 7/2000 | Yamamoto |
| 6,266,528 B1 | 7/2001 | Farzaneh |
| 6,292,153 B1 | 9/2001 | Aiello |
| 6,307,524 B1 | 10/2001 | Britain |
| 6,317,599 B1 | 11/2001 | Rappaport |
| 6,326,922 B1 | 12/2001 | Hegendoerfer |
| 6,337,628 B2 | 1/2002 | Campana |
| 6,337,668 B1 | 1/2002 | Ito |
| 6,339,404 B1 | 1/2002 | Johnson |
| 6,345,043 B1 | 2/2002 | Hsu |
| 6,356,242 B1 | 3/2002 | Ploussios |
| 6,356,243 B1 | 3/2002 | Schneider |
| 6,356,905 B1 | 3/2002 | Gershman |
| 6,377,227 B1 | 4/2002 | Zhu |
| 6,392,610 B1 | 5/2002 | Braun |
| 6,404,386 B1 | 6/2002 | Proctor |
| 6,407,719 B1 | 6/2002 | Ohira |
| 6,442,507 B1 | 8/2002 | Skidmore |
| 6,445,688 B1 | 9/2002 | Garces |
| 6,493,679 B1 | 12/2002 | Rappaport |
| 6,498,589 B1 | 12/2002 | Horii |
| 6,499,006 B1 | 12/2002 | Rappaport |
| 6,507,321 B2 | 1/2003 | Oberschmidt |
| 6,625,454 B1 | 9/2003 | Rappaport |
| 6,674,459 B2 | 1/2004 | Ben-Shachar |
| 6,701,522 B1 | 3/2004 | Rubin |
| 6,725,281 B1 | 4/2004 | Zintel |
| 6,753,814 B2 | 6/2004 | Killen |
| 6,762,723 B2 | 7/2004 | Nallo |
| 6,772,331 B1 | 8/2004 | Hind et al. |
| 6,779,004 B1 | 8/2004 | Zintel |
| 6,807,577 B1 | 10/2004 | Gillespie |
| 6,819,287 B2 | 11/2004 | Sullivan |
| 6,876,280 B2 | 4/2005 | Nakano |
| 6,888,504 B2 | 5/2005 | Chiang |
| 6,888,893 B2 | 5/2005 | Li |
| 6,892,230 B1 | 5/2005 | Gu |
| 6,906,678 B2 | 6/2005 | Chen |
| 6,910,068 B2 | 6/2005 | Zintel |
| 6,924,768 B2 | 8/2005 | Wu |
| 6,931,429 B2 | 8/2005 | Gouge |
| 6,941,143 B2 | 9/2005 | Mathur |
| 6,947,727 B1 | 9/2005 | Brynielsson |
| 6,950,019 B2 | 9/2005 | Bellone |
| 6,950,523 B1 | 9/2005 | Brickell |
| 6,961,028 B2 | 11/2005 | Joy |
| 6,973,622 B1 | 12/2005 | Rappaport |
| 6,975,834 B1 | 12/2005 | Forster |
| 7,034,770 B2 | 4/2006 | Yang |
| 7,043,277 B1 | 5/2006 | Pfister |
| 7,043,633 B1 | 5/2006 | Fink et al. |
| 7,050,809 B2 | 5/2006 | Lim |
| 7,064,717 B2 | 6/2006 | Kaluzni |
| 7,085,814 B1 | 8/2006 | Gandhi |
| 7,089,307 B2 | 8/2006 | Zintel |
| 7,116,707 B1 | 10/2006 | Armistead |
| 7,127,234 B2 | 10/2006 | Ishii |
| 7,130,895 B2 | 10/2006 | Zintel |
| 7,171,475 B2 | 1/2007 | Weisman |
| 7,181,620 B1 | 2/2007 | Hur |
| 7,197,297 B2 | 3/2007 | Myles |
| 7,234,063 B1 | 6/2007 | Baugher |
| 7,234,156 B2 | 6/2007 | French et al. |
| 7,263,076 B1 | 8/2007 | Leibovitz et al. |
| 7,292,870 B2 | 11/2007 | Heredia et al. |
| 7,363,354 B2 | 4/2008 | Lahti |
| 7,421,578 B1 | 9/2008 | Huang et al. |
| 7,477,894 B1 | 1/2009 | Sinha |
| 7,505,434 B1 | 3/2009 | Backes |
| 7,562,385 B2 | 7/2009 | Thione et al. |
| 7,565,529 B2 | 7/2009 | Beck |
| 7,599,380 B2 | 10/2009 | Whitten |
| 7,669,232 B2 | 2/2010 | Jou |
| 7,715,833 B2 | 5/2010 | Sanchez |
| 7,722,502 B2 | 5/2010 | Holkkola |
| 7,788,703 B2 | 8/2010 | Jou |
| 7,966,497 B2 | 6/2011 | Gantman et al. |
| 8,005,459 B2 | 8/2011 | Balsillie |
| 8,009,644 B2 | 8/2011 | Kuo |
| 8,091,120 B2 | 1/2012 | Perrella et al. |
| 8,108,904 B1 | 1/2012 | Chickering et al. |
| 8,260,278 B2 | 9/2012 | Landsman et al. |
| 8,272,036 B2 | 9/2012 | Jou |
| 8,355,912 B1 | 1/2013 | Keesey et al. |
| 8,605,697 B2 | 12/2013 | Kuo |
| 8,607,315 B2 | 12/2013 | Jou |
| 8,756,668 B2 | 6/2014 | Ranade et al. |
| 8,923,265 B2 | 12/2014 | Kuo |
| 9,071,583 B2 | 6/2015 | Yang |
| 9,092,610 B2 | 7/2015 | Sheu |
| 9,131,378 B2 | 9/2015 | Jou |
| 9,226,146 B2 | 12/2015 | Ranade et al. |
| 2002/0009199 A1 | 1/2002 | Ala-Laurila et al. |
| 2002/0022483 A1 | 2/2002 | Thompson et al. |
| 2002/0031130 A1 | 3/2002 | Tsuchiya |
| 2002/0047800 A1 | 4/2002 | Proctor |
| 2002/0080767 A1 | 6/2002 | Lee |
| 2002/0084942 A1 | 7/2002 | Tsai |
| 2002/0105471 A1 | 8/2002 | Kojima |
| 2002/0112058 A1 | 8/2002 | Weisman |
| 2002/0158798 A1 | 10/2002 | Chiang |
| 2002/0169966 A1 | 11/2002 | Nyman |
| 2002/0170064 A1 | 11/2002 | Monroe |
| 2003/0026240 A1 | 2/2003 | Eyuboglu |
| 2003/0030588 A1 | 2/2003 | Kalis |
| 2003/0063591 A1 | 4/2003 | Leung |
| 2003/0122714 A1 | 7/2003 | Wannagot |
| 2003/0156558 A1 | 8/2003 | Cromer et al. |
| 2003/0162533 A1 | 8/2003 | Moles |
| 2003/0169330 A1 | 9/2003 | Ben-Shachar |
| 2003/0184490 A1 | 10/2003 | Raiman |
| 2003/0189514 A1 | 10/2003 | Miyano |
| 2003/0189521 A1 | 10/2003 | Yamamoto |
| 2003/0189523 A1 | 10/2003 | Ojantakanen |
| 2003/0191935 A1 | 10/2003 | Ferguson |
| 2003/0196084 A1 | 10/2003 | Okereke |
| 2003/0202486 A1 | 10/2003 | Anton et al. |
| 2003/0210207 A1 | 11/2003 | Suh |
| 2003/0227414 A1 | 12/2003 | Saliga |
| 2004/0014432 A1 | 1/2004 | Boyle |
| 2004/0017310 A1 | 1/2004 | Vargas-Hurlston |
| 2004/0017860 A1 | 1/2004 | Liu |
| 2004/0027291 A1 | 2/2004 | Zhang |
| 2004/0027304 A1 | 2/2004 | Chiang |
| 2004/0030900 A1 | 2/2004 | Clark |
| 2004/0032378 A1 | 2/2004 | Volman |
| 2004/0036651 A1 | 2/2004 | Toda |
| 2004/0036654 A1 | 2/2004 | Hsieh |
| 2004/0041732 A1 | 3/2004 | Aikawa |
| 2004/0048593 A1 | 3/2004 | Sano |
| 2004/0058690 A1 | 3/2004 | Ratzel |
| 2004/0061653 A1 | 4/2004 | Webb |
| 2004/0070543 A1 | 4/2004 | Masaki |
| 2004/0073786 A1 | 4/2004 | O'Neill |
| 2004/0080455 A1 | 4/2004 | Lee |
| 2004/0095278 A1 | 5/2004 | Kanemoto |
| 2004/0097217 A1 | 5/2004 | McClain |
| 2004/0114535 A1 | 6/2004 | Hoffmann |
| 2004/0121749 A1 | 6/2004 | Cui et al. |

(56) References Cited

U.S. PATENT DOCUMENTS

| | | |
|---|---|---|
| 2004/0125777 A1 | 7/2004 | Doyle |
| 2004/0141617 A1 | 7/2004 | Volpano |
| 2004/0153647 A1 | 8/2004 | Rotholtz et al. |
| 2004/0190477 A1 | 9/2004 | Olson |
| 2004/0203593 A1 | 10/2004 | Whelan |
| 2004/0214570 A1 | 10/2004 | Zhang |
| 2004/0214572 A1 | 10/2004 | Thompson et al. |
| 2004/0260800 A1 | 12/2004 | Gu |
| 2005/0010680 A1 | 1/2005 | Zick et al. |
| 2005/0022210 A1 | 1/2005 | Zintel |
| 2005/0041739 A1 | 2/2005 | Li |
| 2005/0042988 A1 | 2/2005 | Hoek |
| 2005/0050352 A1 | 3/2005 | Narayanaswami et al. |
| 2005/0074018 A1 | 4/2005 | Zintel |
| 2005/0097503 A1 | 5/2005 | Zintel |
| 2005/0100166 A1 | 5/2005 | Smetters |
| 2005/0129222 A1 | 6/2005 | Creamer et al. |
| 2005/0135480 A1 | 6/2005 | Li |
| 2005/0138137 A1 | 6/2005 | Encamacion |
| 2005/0138193 A1 | 6/2005 | Encamacion |
| 2005/0152305 A1 | 7/2005 | Ji et al. |
| 2005/0165953 A1 | 7/2005 | Oba et al. |
| 2005/0180381 A1 | 8/2005 | Retzer |
| 2005/0188193 A1 | 8/2005 | Kuehnel |
| 2005/0220048 A1 | 10/2005 | Lee et al. |
| 2005/0222933 A1 | 10/2005 | Wesby |
| 2005/0228874 A1 | 10/2005 | Edgett et al. |
| 2005/0240665 A1 | 10/2005 | Gu |
| 2005/0250472 A1 | 11/2005 | Silvester |
| 2005/0261970 A1 | 11/2005 | Vucina et al. |
| 2005/0267935 A1 | 12/2005 | Gandhi et al. |
| 2005/0268107 A1 | 12/2005 | Harris |
| 2006/0007897 A1 | 1/2006 | Ishii |
| 2006/0031922 A1 | 2/2006 | Sakai |
| 2006/0039276 A1 | 2/2006 | Jain et al. |
| 2006/0046730 A1 | 3/2006 | Briancon et al. |
| 2006/0052085 A1 | 3/2006 | Gregrio Rodriguez et al. |
| 2006/0080415 A1 | 4/2006 | Tu |
| 2006/0080741 A1 | 4/2006 | Nair |
| 2006/0089123 A1 | 4/2006 | Frank |
| 2006/0094371 A1 | 5/2006 | Nguyen |
| 2006/0094400 A1 | 5/2006 | Beachem et al. |
| 2006/0098607 A1 | 5/2006 | Zeng |
| 2006/0123124 A1 | 6/2006 | Weisman |
| 2006/0123125 A1 | 6/2006 | Weisman |
| 2006/0123455 A1 | 6/2006 | Pai |
| 2006/0133405 A1 | 6/2006 | Fee |
| 2006/0165103 A1 | 7/2006 | Trudeau et al. |
| 2006/0168159 A1 | 7/2006 | Weisman |
| 2006/0184660 A1 | 8/2006 | Rao |
| 2006/0184661 A1 | 8/2006 | Weisman |
| 2006/0184693 A1 | 8/2006 | Rao |
| 2006/0189298 A1 | 8/2006 | Marcelli |
| 2006/0200851 A1 | 9/2006 | Hung |
| 2006/0223527 A1 | 10/2006 | Lee et al. |
| 2006/0224690 A1 | 10/2006 | Falkenburg |
| 2006/0225107 A1 | 10/2006 | Seetharaman |
| 2006/0227761 A1 | 10/2006 | Scott |
| 2006/0239369 A1 | 10/2006 | Lee |
| 2006/0251256 A1 | 11/2006 | Asokan et al. |
| 2006/0291434 A1 | 12/2006 | Gu |
| 2007/0025302 A1 | 2/2007 | Zhang et al. |
| 2007/0027622 A1 | 2/2007 | Cleron |
| 2007/0047449 A1 | 3/2007 | Berger et al. |
| 2007/0055752 A1 | 3/2007 | Wiegand et al. |
| 2007/0121525 A1 | 5/2007 | Jenster |
| 2007/0124490 A1 | 5/2007 | Kalavade et al. |
| 2007/0130294 A1 | 6/2007 | Nishio |
| 2007/0130456 A1 | 6/2007 | Kuo |
| 2007/0135167 A1 | 6/2007 | Liu |
| 2007/0143832 A1 | 6/2007 | Perrella et al. |
| 2007/0150736 A1 | 6/2007 | Cukier |
| 2007/0165582 A1 | 7/2007 | Batta |
| 2007/0189537 A1 | 8/2007 | Zhang et al. |
| 2007/0199053 A1 | 8/2007 | Sandhu et al. |
| 2007/0211659 A1 | 9/2007 | Li et al. |
| 2007/0249324 A1 | 10/2007 | Jou |
| 2007/0287450 A1 | 12/2007 | Yang |
| 2007/0293951 A1 | 12/2007 | Takahashi |
| 2007/0294528 A1 | 12/2007 | Shoji et al. |
| 2008/0060064 A1 | 3/2008 | Wynn et al. |
| 2008/0075280 A1 | 3/2008 | Ye et al. |
| 2008/0085723 A1 | 4/2008 | Tsao et al. |
| 2008/0089242 A1 | 4/2008 | Whitten |
| 2008/0109657 A1 | 5/2008 | Bajaj et al. |
| 2008/0119165 A1 | 5/2008 | Mittal et al. |
| 2008/0141244 A1 | 6/2008 | Kelley |
| 2008/0208617 A1 | 8/2008 | Onyon et al. |
| 2008/0212535 A1 | 9/2008 | Karaoguz et al. |
| 2008/0307515 A1 | 12/2008 | Drokov et al. |
| 2009/0005005 A1 | 1/2009 | Forstall et al. |
| 2009/0013210 A1 | 1/2009 | McIntosh et al. |
| 2009/0059288 A1 | 3/2009 | Mitsui |
| 2009/0070859 A1 | 3/2009 | Mathur et al. |
| 2009/0092255 A1 | 4/2009 | Jou |
| 2009/0103731 A1 | 4/2009 | Sarikaya |
| 2009/0119190 A1 | 5/2009 | Realini |
| 2009/0187970 A1 | 7/2009 | Mower et al. |
| 2009/0193118 A1 | 7/2009 | Cox et al. |
| 2009/0217048 A1 | 8/2009 | Smith |
| 2010/0070542 A1 | 3/2010 | Feinsmith |
| 2010/0299518 A1 | 11/2010 | Viswanathan et al. |
| 2010/0332828 A1 | 12/2010 | Goto |
| 2011/0007705 A1 | 1/2011 | Buddhikot et al. |
| 2011/0035624 A1 | 2/2011 | Miller |
| 2011/0040870 A1 | 2/2011 | Wynn et al. |
| 2011/0047603 A1 | 2/2011 | Gordon et al. |
| 2011/0055898 A1 | 3/2011 | Jou |
| 2011/0126016 A1 | 5/2011 | Sun |
| 2011/0145593 A1 | 6/2011 | Auradkar et al. |
| 2011/0167478 A1 | 7/2011 | Krishnaswamy et al. |
| 2011/0208866 A1 | 8/2011 | Marmolejo-Meillon et al. |
| 2011/0246765 A1 | 10/2011 | Schibuk |
| 2011/0264906 A1 | 10/2011 | Pourzandi et al. |
| 2011/0271111 A1 | 11/2011 | Frank et al. |
| 2011/0281609 A1 | 11/2011 | Kuo |
| 2012/0030466 A1 | 2/2012 | Yamaguchi |
| 2012/0054338 A1 | 3/2012 | Ando |
| 2012/0078949 A1 | 3/2012 | Allen et al. |
| 2012/0089845 A1 | 4/2012 | Raleigh |
| 2012/0134291 A1 | 5/2012 | Raleigh |
| 2012/0257536 A1 | 10/2012 | Kholaif et al. |
| 2012/0278654 A1 | 11/2012 | Shen |
| 2012/0284785 A1 | 11/2012 | Salkintzis et al. |
| 2012/0317625 A1 | 12/2012 | Jou |
| 2012/0322035 A1 | 12/2012 | Julia et al. |
| 2013/0007853 A1 | 1/2013 | Gupta et al. |
| 2013/0047218 A1 | 2/2013 | Smith |
| 2013/0111217 A1 | 5/2013 | Kopasz et al. |
| 2013/0173916 A1 | 7/2013 | Sato |
| 2013/0182693 A1 | 7/2013 | Sperling et al. |
| 2013/0223222 A1 | 8/2013 | Kotecha et al. |
| 2013/0269008 A1 | 10/2013 | Sheu et al. |
| 2014/0007209 A1 | 1/2014 | Zucker |
| 2014/0053281 A1 | 2/2014 | Benoit et al. |
| 2014/0066112 A1 | 3/2014 | Kuo |
| 2014/0068724 A1 | 3/2014 | Jou |
| 2014/0247943 A1 | 9/2014 | Harkins |
| 2014/0282951 A1 | 9/2014 | Ranade |
| 2015/0133089 A1 | 5/2015 | Kuo |
| 2015/0257009 A1 | 9/2015 | Sheu |
| 2015/0296377 A1 | 10/2015 | Sheu |

FOREIGN PATENT DOCUMENTS

| | | |
|---|---|---|
| CN | 1691816 A | 11/2005 |
| CN | 1708162 | 12/2005 |
| CN | 1759550 A | 4/2006 |
| CN | 1316862 | 10/2011 |
| CN | 103441984 | 12/2013 |
| CN | 103858106 | 6/2014 |
| EP | 0 352 787 | 7/1989 |
| EP | 0 534 612 | 3/1993 |
| EP | 1 315 311 | 5/2003 |

(56) References Cited

FOREIGN PATENT DOCUMENTS

| | | |
|---|---|---|
| EP | 1 450 521 | 8/2004 |
| EP | 1 608 108 | 12/2005 |
| EP | 1 638 261 | 3/2006 |
| EP | 1 724 691 | 11/2006 |
| EP | 2 705 429 | 3/2014 |
| EP | 1 958 369 | 4/2015 |
| JP | 3038933 | 7/1989 |
| JP | 2008/088633 | 2/1996 |
| JP | 2001/057560 | 2/2002 |
| JP | 2005/354249 | 12/2005 |
| JP | 2006/060408 | 3/2006 |
| JP | 2014-522142 | 8/2014 |
| TW | 201146029 A1 | 12/2011 |
| TW | 201351188 | 12/2013 |
| WO | WO 00/72506 A1 | 11/2000 |
| WO | WO 01/84323 | 11/2001 |
| WO | WO 02/25967 | 3/2002 |
| WO | WO 03/079484 | 9/2003 |
| WO | WO 2004/084458 A2 | 9/2004 |
| WO | WO 2007/064822 | 6/2007 |
| WO | WO 2007/127120 | 11/2007 |
| WO | WO 2007/127162 | 11/2007 |
| WO | WO 2012/151224 | 11/2012 |
| WO | WO 2013/119750 | 8/2013 |
| WO | WO 2013/152027 | 10/2013 |

OTHER PUBLICATIONS

"Fast Pre-Authentication Based on Proactive Key Distribution for 802.11 Infrastructure Networks"; Kassab et al; WMuNeP'05, Oct. 13, 2005, Montreal, Quebec, Canada. Copyright 2005 ACM, 8 pages.*

"Fast Authentication Methods for Handovers between IEEE 802.11 Wireless LANs", Bargh et al., Proceedings of the ACM International Workshop on Wireless Mobile Applications and Services on WLAN Hotspots. Oct. 1, 2004; 10 pages.*

Aboba, Bernard "Virtual Access Points," IEEEP802.11 Wireless LANs, XX, XX, No. 802.11-03/154rl, May 22, 2003.

Areg Alimian et al., "Analysis of Roaming Techniques," doc.:IEEE 802.11-04/0377r1, Submission, Mar. 2004.

Bargh et al., "Fast Authentication Methods for Handovers between IEEE 802.11 Wireless LANs", Proceedings of the ACM International Workshop on Wireless Mobile Applications and Services on WLAN Hotspots. Oct. 1, 2004.

Chang, Nicholas B. et al., "Optimal Channel Probing and Transmission Scheduling for Opportunistics Spectrum Access," Sep. 2007.

Cisco Systems, "Cisco Aironet Access Point Software Configuration Guide: Configuring Filters and Quality of Service," Aug. 2003.

Dell Inc., "How Much Broadcast and Multicast Traffic Should I Allow in My Network," PowerConnect Application Note #5, Nov. 2003.

Dunkels, Adam et al., "Connecting Wireless Sensornets with TCP/IP Networks," Proc. of the 2d Int'l Conf. on Wired Networks, Frankfurt, Feb. 2004.

Dunkels, Adam et al., "Making TCP/IP Viable for Wireless Sensor Networks," Proc. of the 1st Euro. Workshop on Wireless Sensor Networks, Berlin, Jan. 2004.

Dutta, Ashutosh et al., "MarconiNet Supporting Streaming Media Over Localized Wireless Multicast," Proc. of the 2d Int'l Workshop on Mobile Commerce, 2002.

Encrypted Preshared key; cisco corp. 14 pages, 2010 (Date of Download: Nov. 20, 2013).

Festag, Andreas, "What is MOMBASA?" Telecommunication Networks Group (TKN), Technical University of Berlin, Mar. 7, 2002.

Golmie, Nada, "Coexistence in Wireless Networks: Challenges and System-Level Solutions in the Unlicensed Bands," Cambridge University Press, 2006.

Hewlett Packard, "HP ProCurve Networking: Enterprise Wireless LAN Networking and Mobility Solutions," 2003.

Hirayama, Koji et al., "Next-Generation Mobile-Access IP Network," Hitachi Review vol. 49, No. 4, 2000.

Ian F. Akyildiz, et al., "A Virtual Topology Based Routing Protocol for Multihop Dynamic Wireless Networks," Broadband and Wireless Networking Lab, School of Electrical and Computer Engineering, Georgia Institute of Technology, Jul. 2001.

IEEE Trial-Use Recommended Practice for Multi-Vendor Access Point Interoperability Via an Inter-Access Point Protocol Across Distribution Systems Supporting IEEE 802.11 Operation; IEEE STD 802.11F-2003 ED, IEEE Standard, IEEE, Piscataway, NJ, USA, Jan. 1, 2003, pp. 1-67.

Information Society Technologies Ultrawaves, "System Concept / Architecture Design and Communication Stack Requirement Document," Feb. 23, 2004.

Kassab et al., "Fast Pre-Authentication Based on Proactive Key Distribution for 802.11 Infrastructure Networks", WMuNeP'05, Oct. 13, 2005, Montreal, Quebec, Canada, Copyright 2005 ACM.

Keidl et al., TES2003, LNCS v. 2819, pp. 104-118, Sep. 2003.

Ken Tang, et al., "MAC Layer Broadcast Support in 802.11 Wireless Networks," Computer Science Department, University of California, Los Angeles, 2000 IEEE, pp. 544-548.

Ken Tang, et al., "MAC Reliable Broadcast in Ad Hoc Networks," Computer Science Department, University of California, Los Angeles, 2001 IEEE, pp. 1008-1013.

Mawa, Rakesh, "Power Control in 3G Systems," Hughes Systique Corporation, Jun. 28, 2006.

Microsoft Corporation, "IEEE 802.11 Networks and Windows XP," Windows Hardware Developer Central, Dec. 4, 2001.

Pat Calhoun et al., "802.11r strengthens wireless voice," Technology Update, Network World, Aug. 22, 2005, http://www.networkworld.com/news/tech/2005/082208techupdate.html.

Steger, Christopher et al., "Performance of IEEE 802.11b Wireless LAN in an Emulated Mobile Channel," 2003.

Toskala, Antti, "Enhancement of Broadcast and Introduction of Multicast Capabilities in RAN," Nokia Networks, Palm Springs, California, Mar. 13-16, 2001.

Tsunekawa, Kouichi, "Diversity Antennas for Portable Telephones", 39th IEEE Vehicular Technology Conference, pp. 50-56, vol. 1, Gateway to New Concepts in Vehicular Technology, May 1-3, 1989, San Francisco, CA.

Vincent D. Park, et al., "A Performance Comparison of the Temporally-Ordered Routing Algorithm and Ideal Link-State Routing," IEEE, Jul. 1998, pp. 592-598.

Wennstrom, Mattias et al., "Transmit Antenna Diversity in Ricean Fading MIMO Channels with Co-Channel Interference," 2001.

Yang, Song Li, Virtual AP for 802.11 Seamless Handoff draft-song-80211-seamless-handoff-00.txt, Nov. 2005.

Extended European Search Report for EP application No. 07755678.5 mailed Dec. 29, 2011.

Extended European Search Report for EP application No. 06838713.3 mailed Jul. 13, 2011.

Extended European Search Report for EP application No. 12779857.7 dated Mar. 30, 2015.

Extended European Search Report for EP application No. 14163071.5 mailed Jul. 4, 2014.

Supplementary European Search Report for EP application No. 07755678.5 mailed Jan. 17, 2012.

PCT Application No. PCT/US2006/045893, International Search Report and Written Opinion Sep. 25, 2007.

PCT Application No. PCT/US2007/09836, International Search Report and Written Opinion Sep. 12, 2008.

PCT Application No. PCT/US2007/09503, International Search Report and Written Opinion Mar. 3, 2008.

PCT Application No. PCT/US2012/036028, International Search Report and Written Opinion Aug. 17, 2012.

PCT Application No. PCT/US2013/34997, International Search Report mailed Jun. 17, 2013.

PCT Application No. PCT/US2013/34997, Written Opinion mailed Jun. 17, 2013 (Date of Online Publication: Oct. 4, 2014).

Chinese Office Action for CN Application No. 200680045272.7 dated Oct. 27, 2011.

Chinese Office Action for CN Application No. 200680045272.7 dated Jul. 12, 2011.

(56) References Cited

OTHER PUBLICATIONS

Chinese Office Action for CN Application No. 200680045272.7 dated Feb. 1, 2011.
Chinese Office Action for CN Application No. 200680045272.7 dated Jul. 15, 2010.
Chinese Office Action for CN Application No. 200780019074.8 dated Jun. 15, 2011.
Chinese Office Action for CN Application No. 200780019389.2 dated Sep. 12, 2012.
Chinese Office Action for CN Application No. 200780019389.2 dated Feb. 14, 2012.
Chinese Office Action for CN Application No. 200780019389.2 dated Apr. 8, 2011.
Chinese Office Action for CN Application No. 201280021332.7 dated Dec. 11, 2015.
European First Examination Report for EP Application No. 068387133 dated Apr. 3, 2012.
European Second Examination Report for EP Application No. 07755678.5 dated Feb. 3, 2014.
European First Examination Report for EP Application No. 07755678.5 dated Oct. 23, 2012.
European First Examination Report for EP Application No. 07755913.6 dated Jul. 4, 2013.
U.S. Appl. No. 11/607,619, Office Action mailed Oct. 13, 2010.
U.S. Appl. No. 11/607,619, Final Office Action mailed Dec. 4, 2009.
U.S. Appl. No. 11/607,619, Office Action mailed Apr. 29, 2009.
U.S. Appl. No. 13/191,383, Office Action mailed Jul. 22, 2013.
U.S. Appl. No. 11/788,371, Final Office Action mailed Jan. 21, 2010.
U.S. Appl. No. 11/788,371, Office Action mailed Sep. 17, 2009.
U.S. Appl. No. 11/789,446, Final Office Action mailed Oct. 13, 2010.
U.S. Appl. No. 11/789,446, Office Action mailed May 24, 2010.
U.S. Appl. No. 11/789,446, Final Office Action mailed Jun. 24, 2009.
U.S. Appl. No. 11/789,446, Office Action mailed Sep. 3, 2008.
U.S. Appl. No. 12/339,688, Office Action mailed Sep. 15, 2009.
U.S. Appl. No. 12/845,089, Final Office Action mailed Feb. 14, 2012.
U.S. Appl. No. 12/845,089, Office Action mailed Sep. 6, 2011.
U.S. Appl. No. 13/590,997, Office Action mailed Jul. 18, 2013.
U.S. Appl. No. 14/078,947, Final Office Action mailed Feb. 23, 2015.
U.S. Appl. No. 14/078,947, Office Action mailed Sep. 24, 2014.
U.S. Appl. No. 13/370,201, Office Action mailed May 13, 2013.
U.S. Appl. No. 14/294,012, Office Action mailed Mar. 23, 2015.
U.S. Appl. No. 13/439,844, Office Action mailed Apr. 22, 2014.
U.S. Appl. No. 13/439,844, Final Office Action mailed Oct. 28, 2013.
U.S. Appl. No. 13/439,844, Office Action mailed Jun. 5, 2013.
U.S. Appl. No. 13/461,679, Final Office Action mailed May 28, 2015.
U.S. Appl. No. 13/461,679, Office Action mailed Mar. 28, 2014.
U.S. Appl. No. 13/461,679, Final Office Action mailed Oct. 25, 2013.
U.S. Appl. No. 13/461,679, Office Action mailed Apr. 1, 2013.
TIPO Office Action for related Taiwanese Application No. 102112203 dated Aug. 29, 2016 (12 sheets).
SIPO Office Action for related Chinese Patent Application No. 201310291285.4, dated Sep. 5, 2016 (26 sheets).
U.S. Office Action for related U.S. Appl. No. 14/751,833, dated Oct. 20, 2016 (9 sheets).
U.S. Final Office Action for related U.S. Appl. No. 14/692,485 dated Sep. 6, 2016 (28 sheets).
U.S. Office Action for related U.S. Appl. No. 13/461,679, dated Jan. 21, 2016 (12 sheets).

* cited by examiner

DYNAMIC PSK FOR HOTSPOTS

CROSS-REFERENCE TO RELATED APPLICATIONS

The present application is a continuation and claims the priority benefit of U.S. patent application Ser. No. 14/294,012 filed Jun. 2, 2014, which is a continuation and claims the priority benefit of U.S. patent application Ser. No. 13/370,201 filed Feb. 9, 2012, now U.S. Pat. No. 8,756,668, the disclosures of which are incorporated herein by reference.

BACKGROUND

Field of the Invention

The present invention generally relates to wireless hotspots. More specifically, the present invention relates to dynamic pre-shared key (PSK) for wireless hotspots.

Description of the Related Art

An increasing number of individuals and businesses rely on wireless services to carry out various transactions and enable communication from remote locations. Many businesses such as hotels and coffee houses have sought to capitalize on this trend and offer free wireless access to attract and retain customers. A business offering such wireless access may do by creating a "hotspot"—a location that offers Internet access over a wireless local area network through the use of a router connected to a link to an Internet service provider.

Many hotspots only offer open and unsecured communications. Some users, however, may wish to engage in communications or transactions that involve personal, sensitive, or proprietary information that is not necessarily suited for an open and unsecured communications network. As such, users may wish for such transactions be conducted in a secure manner, such that such information may not be exposed or stolen.

Implementing security features is complicated, difficult to maintain, and requires a high level of technical knowledge. An additional complication is that users at a hotspot may be continually changing. Authentication relying on 802.1x/EAP is not a practical option as hotspot users may vary widely in security needs. Setting up a RADIUS server on a network backend may likewise be complicated and unwieldy.

Pre-shared key (PSK)-based security systems require that a secret be manually entered onto all user devices using the network. A PSK-based system relies on a secret shared between and stored at both the client station and the access point. The secret may be, for example, a long bit stream, such as a passphrase, a password, a hexadecimal string, or the like. Used by a client station and the access point to authenticate each other, the secret may also be used to generate an encryption key set.

A disadvantage to PSK-based systems is that once the shared secret becomes known to unauthorized personnel, the security of the entire network is compromised. This may pose a problem where network access is provided to an ever-changing set of numerous, diverse, and transient mobile users. Generally, to maintain the security of a PSK-based system, the secret must be changed on all client stations whenever a person with knowledge of the secret departs from the organization or is no longer authorized to access the network. As a result, many commercial organizations (e.g., small- and medium-sized businesses or enterprises with a high degree of turn over) have been unable to deploy security measures around their hotspots, because of their lack of expertise and/or full-time professional technical support.

There is, therefore, a need in the art for improved systems and methods for providing secure network access at hotspots

SUMMARY OF THE CLAIMED INVENTION

Embodiments of the present invention include systems and methods for providing secured network access at a hotspot. A user device located within range of the hotspot initiates a request to be sent via an open communication network associated with the hotspot. The request concerns secured network access at the hotspot by the user device. In response, a unique pre-shared key is generated for the user device based on information in the received request and transmitted over the open communication network for display on a webpage accessible to the user device. The unique pre-shared key is also stored in association with information regarding the user device. The user device may then use the unique pre-shared key in subsequent requests for secured network access.

Various embodiments of the present invention include methods for providing secured network access at a hotspot. Such methods may include receiving a request initiated by a user device located within a range of a hotspot. The request is sent via an open communication network associated with the hotspot and concerning secured network access at the hotspot by the user device. Methods may further include generating a unique pre-shared key for the user device based on information in the received request, transmitting the unique pre-shared key over the open communication network for display on a webpage accessible to the user device, and storing the unique pre-shared key in association with information regarding the user device. The user device may then the unique pre-shared key in a subsequent request for secured network access.

Additional embodiments include apparatuses for providing secured network access at a hotspot. Such apparatuses may include an interface for receiving an incoming requests initiated by a user device located within a range of a hotspot concerning secured network access at the hotspot by the user device, a processor for executing instructions stored in memory to generates a unique pre-shared key for the user device based on information in the received request, and a database in memory for storing the unique pre-shared key in association with information regarding the user device. The unique pre-shared key is transmitted over the open communication network for display on a webpage accessible to the user device. The user device may then the unique pre-shared key in a subsequent request for secured network access.

Embodiments of the present invention may further include systems for providing secured network access at a hotspot. Such systems may include an access point associated with a hotspot and providing both open access over an open communication network and secured network access based on a pre-shared key. Systems may further include a hotspot controller for receiving an incoming request initiated by a user device concerning secured network access at the hotspot, generating a unique pre-shared key for the user device based on information in the received request, storing the unique pre-shared key in association with information regarding the user device, and transmitting the unique pre-shared key over the open communication network for display on a webpage accessible to the user device. The user device may then the unique pre-shared key in a subsequent request for secured network access.

Other embodiments of the present invention include non-transitory computer-readable storage media on which is embodied instructions executable to providing secured network access at a hotspot in general accordance with the method previously set forth above.

DETAILED DESCRIPTION

Embodiments of the present invention provide systems and methods for secured network access at a hotspot. A user device located within range of the hotspot initiates a request to be sent via an open communication network associated with the hotspot. The request concerns secured network access at the hotspot by the user device. In response, a unique pre-shared key is generated for the user device based on information in the received request and transmitted over the open communication network for display on a webpage accessible to the user device. The unique pre-shared key is also stored in association with information regarding the user device. The user device may then use the unique pre-shared key in subsequent requests for secured network access.

Figure 1:
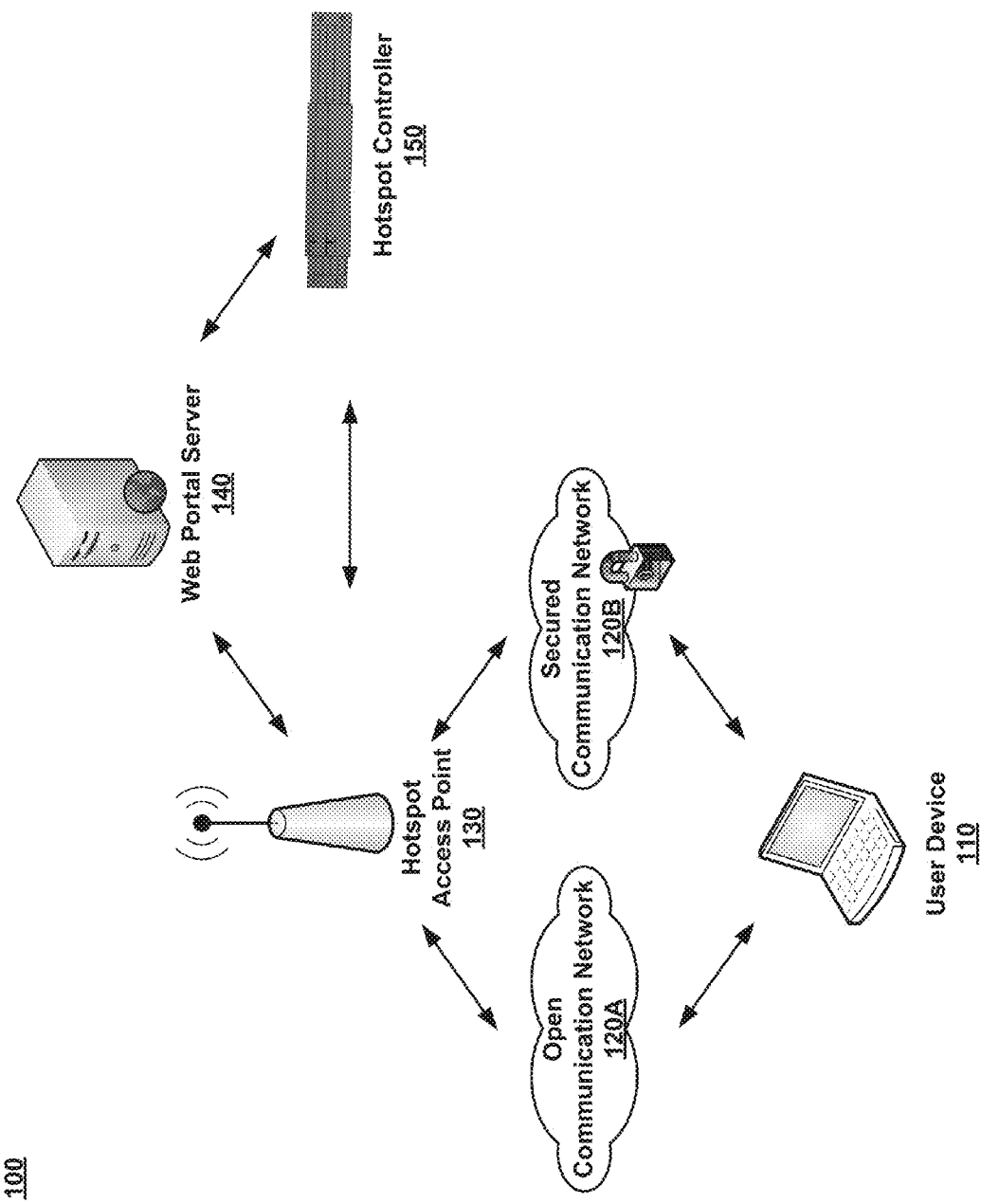
FIG. 1 illustrates a network environment in which a system for providing secured network access at a hotspot may be implemented.

FIG. 1 illustrates a network environment 100 in which a system for secured network access at a hotspot may be implemented. Network environment 100 may include a user devices 110 and a 'hotspot' including access point 130 and that provides open communication network 120A and secured communication network 120B. The network environment 100 may further include web portal server 140 and a hotspot controller 150.

Users may use any number of different wireless user devices 110 such as notebook, netbook, and tablet computers with WiFi capability, smartphones with WiFi capability, or any other type of wireless computing device capable of communicating over communication networks 120. User device 110 may also be configured to access data from other storage media, such as memory cards or disk drives as may be appropriate in the case of downloaded services. User device 110 may include standard hardware computing components such as network (e.g., wireless) and media interfaces, non-transitory computer-readable storage (memory), and processors for executing instructions that may be stored in memory.

Communication networks 120A-B may convey various kinds of information to user devices, such as user device 110. Communication networks 120A-B may be a local, proprietary network (e.g., an intranet) and/or may be a part of a larger wide-area network. The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications networks 120A-B allow a connecting device (e.g., user device 110 to access the Internet. Open communication network 120A is open and unsecured. As such, any user device 110 may be able to connect to the open communication network 120A without (much) restriction. In contrast, secured communication network 120B may involve various security policies and protocols so that communications to and from user device 110 may remain secure.

Communication networks 120A-B are provided by a hotspot access point 130, which can transmit various electromagnetic waves. Examples of wireless protocols that might be used by hotspot access point 130 include IEEE 802.11 (Wi-Fi or Wireless LAN), IEEE 802.16 (WiMAX), or IEEE 802.16c network. Hotspot may be inclusive or a number of wireless transceivers distributed over an area.

Access point 130 includes, at the least, an antenna system, radio, memory, and processor. The antenna system wirelessly receives and transmits data packets. For example, the antenna system can receive packet data such as Transmission Control Protocol (TCP) and User Datagram Protocol (UDP) packet data using the IEEE 802.11 wireless protocol. Radio converts data into the requisite wireless protocols. Various instructions governing the control of the access point 130 are stored in memory and executed by processor.

One or more wireless or wired connections may be created to allow for data transmission between access point 130 and user device 110 (via communication networks 120A-B) as well as web portal server 140, hotspot controller 150, and various other access points in network environment 100. The antenna may further include selectable antenna elements like those disclosed in U.S. Pat. No. 7,292,198 for a "System and Method for an Omnidirectional Planar Antenna Apparatus," the disclosure of which is incorporated herein by reference. Hotspot access point 130 may also utilize various transmission parameter controls like those disclosed in U.S. Pat. No. 7,889,497 for a "System and Method for Transmission Parameter Control for an Antenna Apparatus with Selectable Elements," the disclosure of which is incorporated herein by reference.

Web portal server 140 may include any type of server or other computing device as is known in the art for providing access to the Internet (web). Web portal server 140 may include standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server. When a user device 110 requests secure network access, the request may be redirected to web portal server 140, which may convey the request to hotspot controller 150.

Hotspot controller 150 manages the one or more hotspot access points 130 in network environment 100. As such, the hotspot controller 150 intelligently manages the hotspot wireless services, including deployment, RF assignments, traffic/load balancing, and security. In terms of security, for example, the hotspot controller 150 may receive a request that a user device 110 be allowed to use the secured communication network 120B. Hotspot controller 150 dynamically generates a unique pre-shared key for the requesting user device 110 and return the key to web portal server 140, which in turns generates a web page displaying the unique pre-shared key to the user device 110. User device 110 may then use the pre-shared key in a request to access secure communication network 120B.

Figure 2:
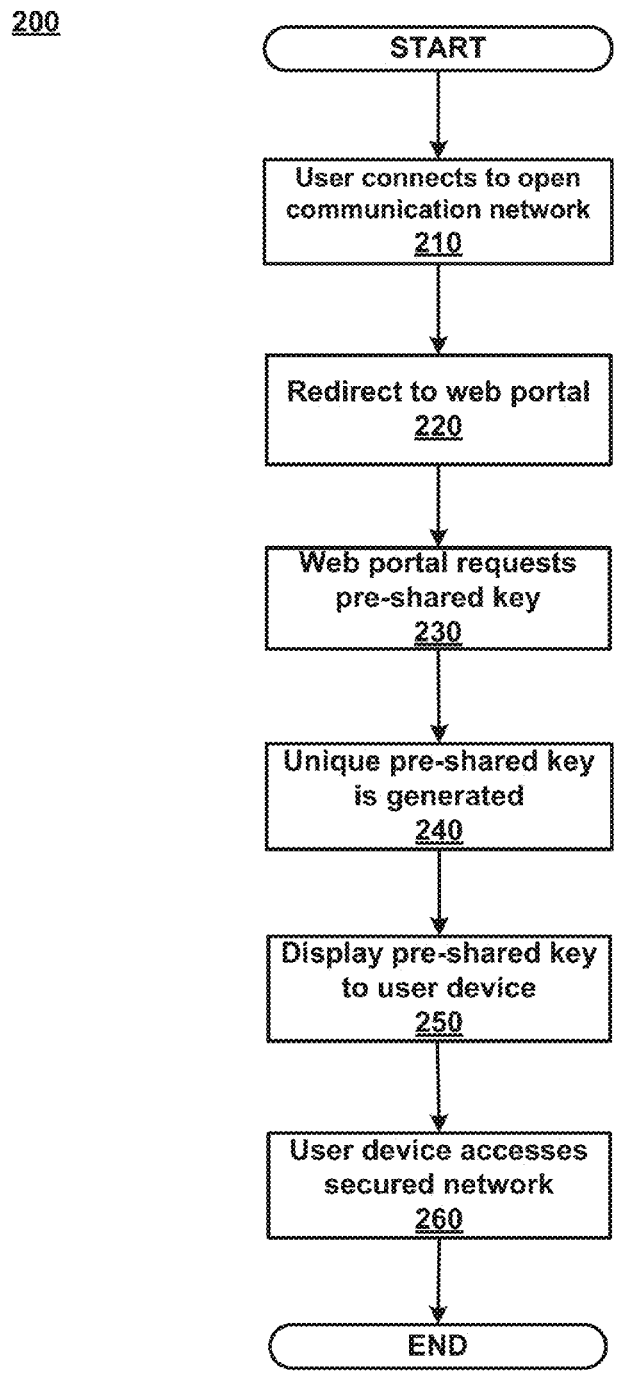
FIG. 2 illustrates a method for providing secured network access at a hotspot.

FIG. 2 illustrates a method 200 for providing secure network access at a hotspot. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, a user device connects to an open communication network hosted by a hotspot access point. The request is redirected to a web portal server, which requests a pre-shared key from a hotspot controller. The hotspot controller may generate and return the unique pre-shared key to the web portal server, which generates a webpage displaying the unique pre-shared key to the user device. The user device may then use the unique pre-shared key to access the secure communication network.

In step 210, a user device 110 connects to an open communication network 120A provided by hotspot access point 130. For some network activity (e.g., reading the news), the user may not necessarily require security and the use of the open communication network 120A may be sufficient. Some transactions (e.g., financial or business related) may require additional security so as to ensure that sensitive information is not exposed or misappropriated by other users of the open communication network 120A. The user of device 110 may be offered access to the secured communication network 120B as an option. Upon selection of that offering, a user request for access to the secure communication network 120B may be sent over the open communication network 120A. Connection to the open communication network 120A may, in some implementations, automatically initiate a request for secure access to the secured communication network 120B.

In step 220, the request for secure network access is redirected to web portal server 140. In addition to information regarding the particular user device 110, the access request may include information concerning various policies and parameters as determined by the particular entity (e.g., business) providing wireless access at the hotspot. These parameters and policies may include information used to configure a wireless device for connection to a restricted wireless network and access policies related to the same, such as a wireless network name, wireless device parameters, adapter configurations, security-related parameters, access constraints, quality of service parameters, security-related parameters, expiration date of the secure access, limits on session duration, bandwidth, user identity, user rewards, and access policies.

In step 230, the web portal server 140 submits a request for a unique pre-shared key to hotspot controller 150. Assigning each individual user/user device 110 a unique pre-shared key ensures that third-parties cannot eavesdrop on or otherwise access information belonging to another user accessing the network by way of device 110. Because each pre-shared key is unique, the encryption (and decryption) of information belonging to one particular user is different from that for any other user. Moreover, when the user leaves the hotspot, the unique pre-shared key assigned to that user/user device 110 does not need to be changed to maintain security for users remaining in the hotspot.

In step 240, the hotspot controller 150 generates a unique pre-shared key for the requesting user device 110 and sends the generated unique pre-shared key to the web portal server 140. Hotspot controller 150 may randomly generate the unique pre-shared secret for each user device 110 using various algorithms and formulas. By providing for randomly generated and unique keys, hotspot controller 150 increases the difficulty of illicitly gaining accessing user information by deducing the secret of any particular user. The unique pre-shared key may further be registered to the user of the user device based on user information provided in the request.

Hotspot controller 150 may also store information associating the particular key with the requesting user device 110. Where a particular business providing the hotspot wishes to apply certain policies and parameters, those policies and parameters may also be stored. A hotel, for example, may wish to provide frequent guests with greater bandwidth than other guests. As such, information regarding the guest identity, the user device 110 belonging to the guests (e.g., as identified by MAC address) and the amount of bandwidth allotted may also be stored in association with the unique pre-shared key.

In step 250, the web portal server 140 generates a webpage to display the unique pre-shared key to the user of user device 110.

In step 260, the unique pre-shared key is entered into user device 110, either manually by the user (e.g., a cut and paste operation), via user selection (e.g., execution of a script associated with a 'install' button), or automatically as a result of instructions embedded with a pre-shared key download package. A subsequent request for access to the secure communication network 120B is generated based on the unique pre-shared key. In some instances, the unique pre-shared key may be bundled as part of a package that may be installed automatically or upon request on the user device 110. The package may include any applications, policies, or parameters required for connection to the secure communication network 120B. For example, an application may be downloaded to the wireless device and executed to survey, configure (e.g., install parameters and policies), and/or connect the wireless device to the secured communication network 120B. The unique pre-shared key may then be used to authenticate the user device 110 so that the user device 110 can access the secured communication network 120B according to the installed policies and parameters.

The present invention may be implemented in a variety of devices. Non-transitory computer-readable storage media refer to any non-transitory storage medium or media that participate in providing instructions to a central processing unit (CPU) for execution. Such media can take many forms, including, but not limited to, non-volatile and volatile media, which may include optical disks, dynamic memory, floppy disks, flexible disks, hard disks, magnetic tape, any other magnetic medium, CD-ROM disks, digital video disks (DVDs), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art along with their full scope of equivalents.

What is claimed is:

1. A method for providing access to a computer network via a hotspot, the method comprising:
    receiving a first request to access the computer network from a user device located within a range of the hotspot;
    redirecting the received request to an intermediary web portal server;
    transmitting to the user device a selectable option for a secure access or an open access to the computer network;
    receiving a selection from the user device regarding a secure access or an open access to the computer network;
    when the received selection is for a secure access to the computer network:
    generating and storing a pre-shared key unique to the user device;
    transmitting the pre-shared key for display on a webpage accessible by the user device;
    receiving a second request for securely accessing the computer network including the pre-shared key, from the user device;
    granting the secure access to the computer network to the user device responsive to the received second request and the received pre-shared key; and
    when the received selection is for an open access to the computer network, granting the open access to the computer network to the user device.

2. The method of claim 1, wherein said pre-shared key unique to the user device is generated based on information received from the user device.

3. The method of claim 1, wherein said pre-shared key unique to the user device is generated randomly.

4. The method of claim 1, further comprising storing in a memory information regarding a plurality of different user devices, each different user device associated with a different pre-shared key unique to the respective different user device.

5. The method of claim 4, wherein the information regarding the plurality of different user devices includes, for each user device, at least one parameter, and wherein secure access to the communication network granted to said each user device is governed at least in part by the at least one parameter, and wherein the at least one parameter includes one or more selected from the group consisting of an expiration date, a session duration, a bandwidth, a user identity, user rewards, and access policies.

6. The method of claim 5, wherein the pre-shared key unique to the user device is utilized to encrypt communications between the computer network and the user device.

7. The method of claim 1, wherein the transmitted pre-shared key is automatically entered into the user device by embedded instructions in a transmitted pre-shared key download package.

8. A non-transitory computer-readable storage medium having embodied thereon a plurality of instructions when executable by a hardware processor to perform a process for providing access to a computer network via a hotspot, the process comprising the steps of:
    receiving a first request to access the computer network from a user device located within a range of the hotspot;
    redirecting the received request to an intermediary web portal server;
    transmitting to the user device a selectable option for a secure access or an open access to the computer network;
    receiving a selection from the user device regarding a secure access or an open access to the computer network;
    when the received selection is for a secure access to the computer network:
    generating and storing a pre-shared key unique to the user device;
    transmitting the pre-shared key for display on a webpage accessible by the user device;
    receiving a second request for securely accessing the computer network including the pre-shared key, from the user device;
    granting the secure access to the computer network to the user device responsive to the received second request and the received pre-shared key; and
    when the received selection is for an open access to the computer network, granting the open access to the computer network to the user device.

9. The non-transitory computer-readable storage medium of claim 8, wherein said pre-shared key unique to the user device is generated based on information received from the user device.

10. The non-transitory computer-readable storage medium of claim 8, wherein said pre-shared key unique to the user device is generated randomly.

11. The non-transitory computer-readable storage medium of claim 8, wherein the transmitted pre-shared key is automatically entered into the user device by embedded instructions in a transmitted pre-shared key download package.

12. The non-transitory computer-readable storage medium of claim 8, further comprising storing in a memory information regarding a plurality of different user devices, each different user device associated with a different pre-shared key unique to the respective different user device.

13. The non-transitory computer-readable storage medium of claim 12, wherein the information regarding the plurality of different user devices includes, for each user device, at least one parameter, and wherein secure access to the communication network granted to said each user device is governed at least in part by the at least one parameter.

14. The non-transitory computer-readable storage medium of claim 13, wherein the at least one parameter includes one or more selected from the group consisting of an expiration date, a session duration, a bandwidth, a user identity, user rewards, and access policies.

15. A system for providing access to a computer network via a hotspot comprising:
    a communication interface for receiving a first request to access the computer network from a user device located within a range of the hotspot;
    a web portal server for receiving a redirected received request, wherein the web portal server transmits to the user device a selectable option for a secure access or an open access to the computer network, and wherein the communication interface receives a selection from the user device regarding a secure access or an open access to the computer network; and a hardware processor for:
    when the received selection is for a secure access to the computer network:
    generating and storing a pre-shared key unique to the user device in a memory;
    transmitting the pre-shared key for display on a webpage accessible by the user device;
    receiving a second request for securely accessing the computer network including the pre-shared key, from the user device;
    granting the secure access to the computer network to the user device responsive to the received second request and the received pre-shared key; and
    when the received selection is for an open access to the computer network, granting the open access to the computer network to the user device.

16. The system of claim 15, wherein said pre-shared key unique to the user device is generated based on information received from the user device.

17. The system of claim 15, wherein said pre-shared key unique to the user device is generated randomly.

18. The system of claim 15, further comprising storing in a memory information regarding a plurality of different user devices, each different user device associated with a different pre-shared key unique to the respective different user device.

19. The system of claim 15, wherein the information regarding the plurality of different user devices includes, for each user device, at least one parameter, and wherein secure access to the communication network granted to said each user device is governed at least in part by the at least one parameter, and wherein the at least one parameter includes one or more selected from the group consisting of an expiration date, a session duration, a bandwidth, a user identity, user rewards, and access policies.

20. The system of claim 15, wherein the transmitted pre-shared key is automatically entered into the user device by embedded instructions in a transmitted pre-shared key download package.

* * * * *